March 21, 1939.   A. P. KING ET AL   2,151,118
TERMINATION FOR DIELECTRIC GUIDES
Filed Feb. 6, 1936   4 Sheets-Sheet 3

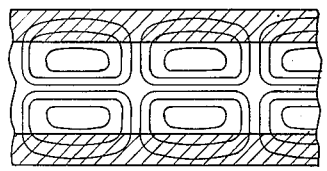
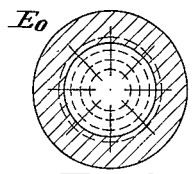
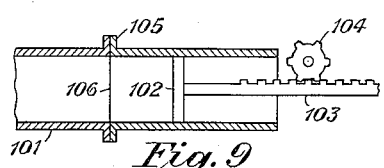
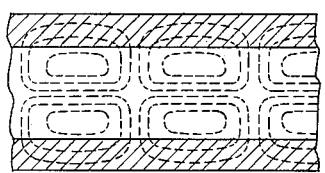
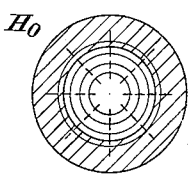
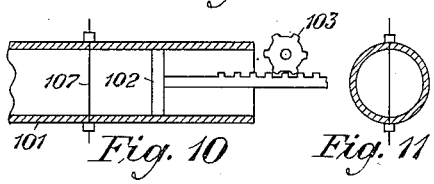
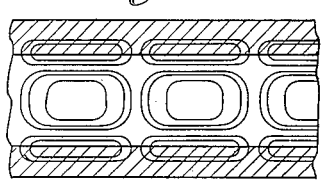
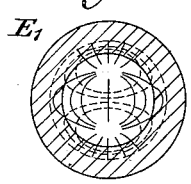
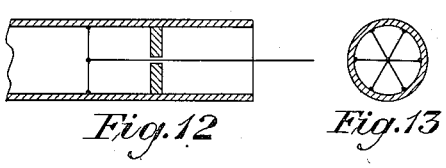
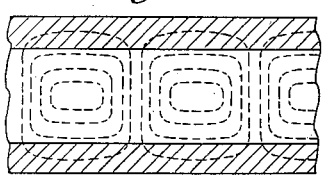
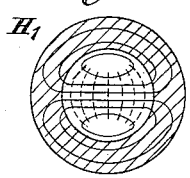
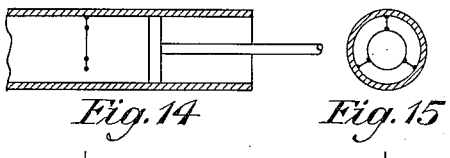
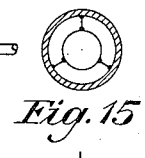
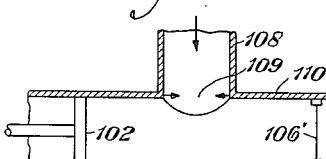
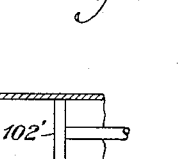
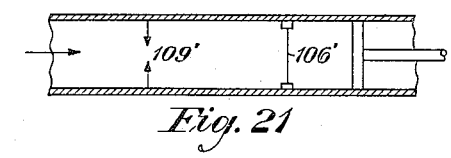
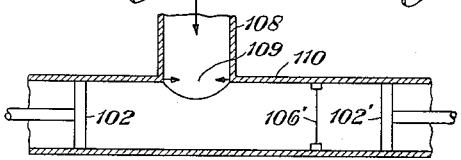
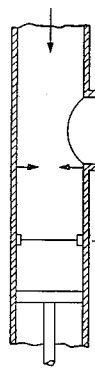
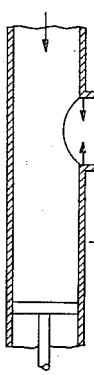
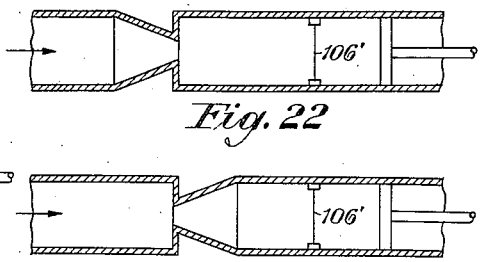
INVENTORS
A. P. King and
A. E. Bowen
BY
ATTORNEY

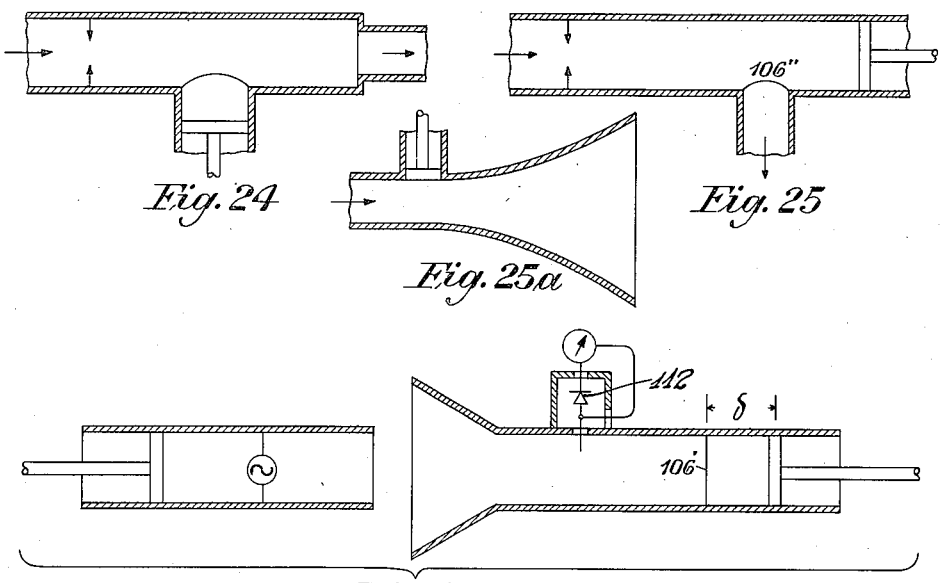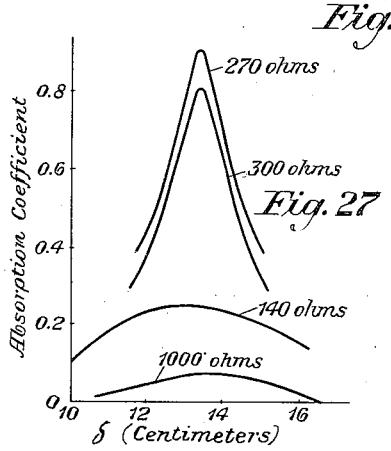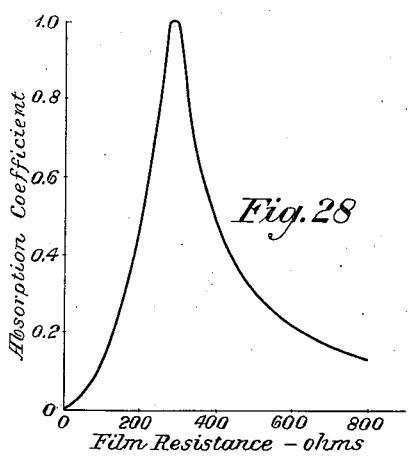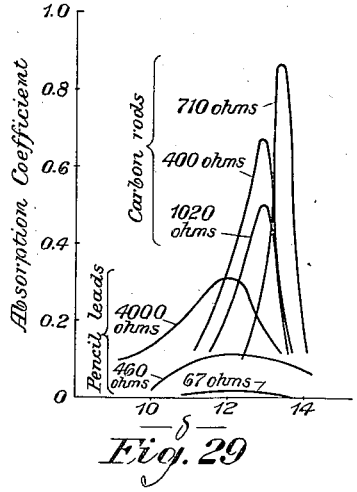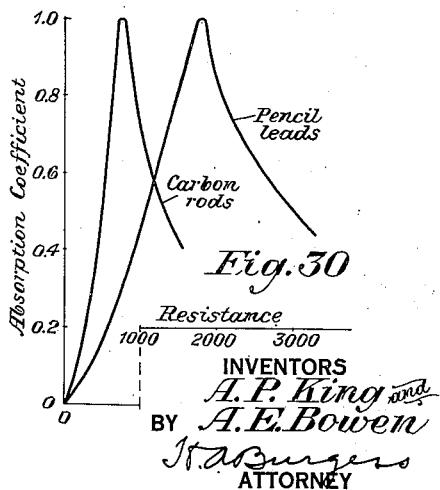

INVENTORS
A. P. King and
BY A. E. Bowen
ATTORNEY

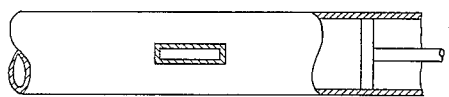
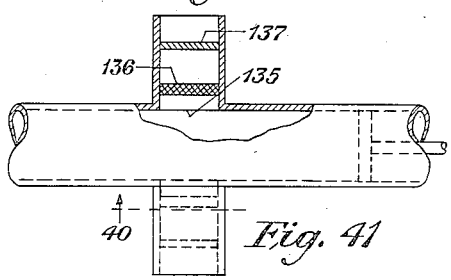
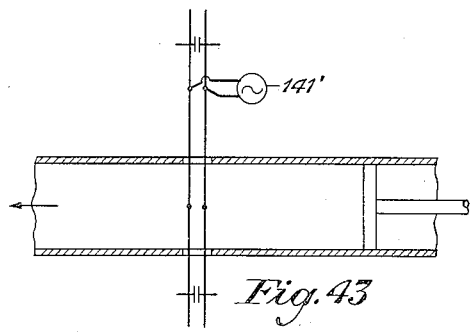
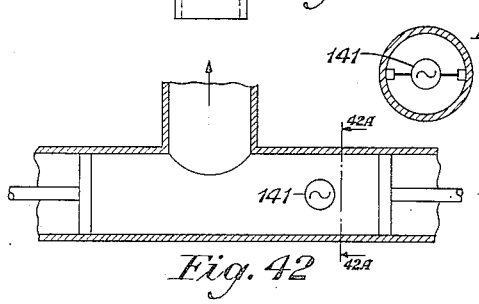
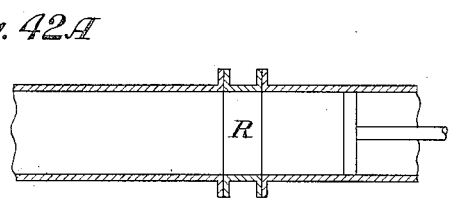
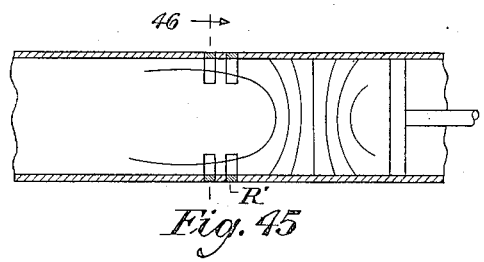
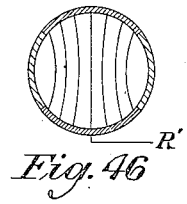
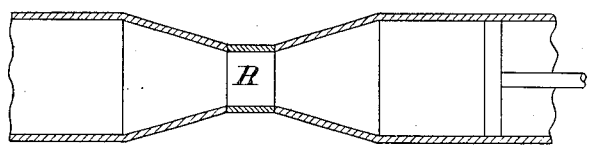
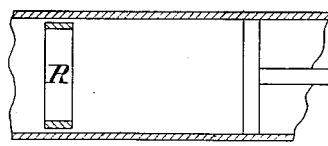

Patented Mar. 21, 1939

2,151,118

UNITED STATES PATENT OFFICE 2,151,118

TERMINATION FOR DIELECTRIC GUIDES

Archie P. King and Arnold E. Bowen, Red Bank, N. J., assignors to Bell Telephone Laboratories, Incorporated, New York, N. Y., a corporation of New York Application February 6, 1936, Serial No. 62,616

10 Claims. (Cl. 178—44)

A principal object of our invention is to provide new and improved apparatus and a corresponding method for terminating a dielectric guide with proper impedance match. Another object of our invention is to provide for absorbing and dissipating all the energy received in the form of electromagnetic waves over a dielectric guide. Another object is to associate a resistance element or other energy dissipating element with adjustable reflectors so that the received energy may be completely absorbed without the necessity for adjusting the resistance element or its equivalent. All these objects and other objects and advantages of our invention will become apparent on consideration of a limited number of specific examples of the invention which we have chosen to be presented in the following specification. It will be understood that this disclosure relates principally to these particular examples of the invention and that the scope of the invention will be indicated in the appended claims.

Figure 31:
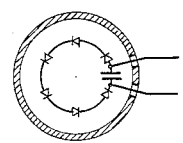
Figure 32:
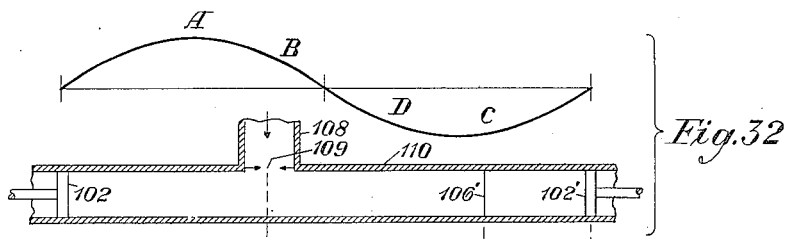
Figure 31A:
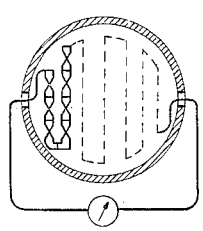
Figure 33:
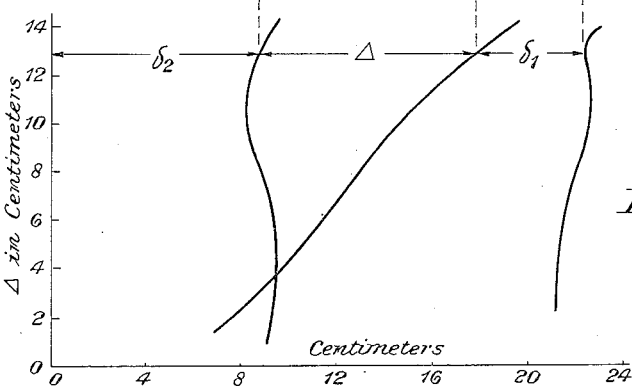
Figure 34:
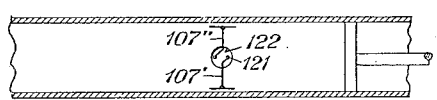
Figure 36:
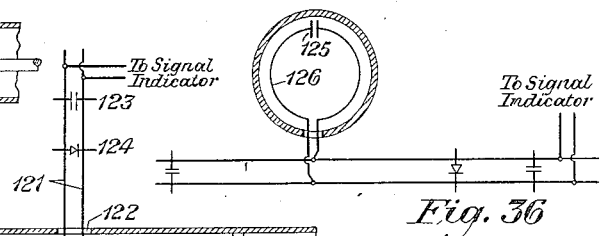
Figure 35:
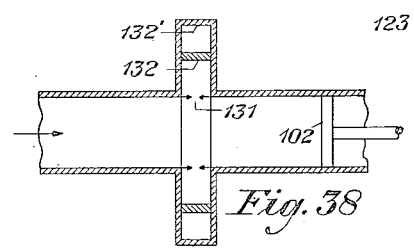
Figure 38:
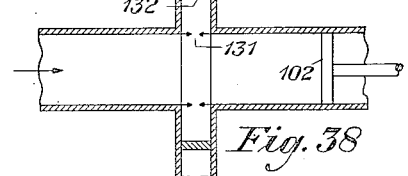
Figure 37:
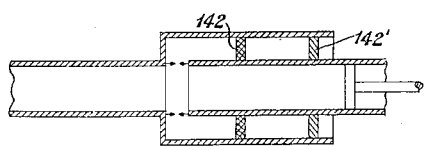
Figure 39:
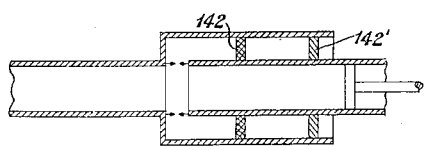

Referring to the drawings, Figures 1, 3, 5 and 7 are diagrammatic longitudinal sections of a dielectric guide showing different wave types therein; Figs. 2, 4, 6 and 8 are corresponding transverse sections; Fig. 9 is a longitudinal section of the receiving end of a dielectric guide showing means for absorbing the energy of received electromagnetic waves of various types in the guide; Fig. 10 is a similar section showing a modification adapted for asymmetric magnetic waves; Fig. 11 is a cross section corresponding to Fig. 10; Figs. 12 and 13 are respectively longitudinal and cross sections of receiving end apparatus adapted for symmetric electric waves; Figs. 14 and 15 are respectively longitudinal and cross-sections of receiving end apparatus adapted for symmetric magnetic waves; Figs. 16 and 17 are respectively longitudinal and cross-sections of receiving end apparatus like that of Figs. 10 and 11, but with a lumped resistance element instead of a distributed resistance as in the earlier figures; Fig. 18 is a longitudinal section of terminating apparatus having two adjustable pistons instead of one as in the figures that have preceded; Figs. 19 and 20 are diagrams of modified arrangements as compared with Fig. 18; Fig. 21 is a longitudinal section of terminating apparatus in which an iris and a single piston are used; Figs. 22 and 23 are modifications of Fig. 21; Figs. 24 and 25 are longitudinal sections of appparatus for connecting two dielectric guides of different diameters with proper impedance match; Fig. 25a is a longitudinal section of the end of a dielectric guide adapted to radiate wave energy received through the guide; Fig. 26 is a diagram showing apparatus for demonstrating experimentally some of the principles involved in our invention; Figs. 27, 28, 29 and 30 are curve diagrams embodying measurements made with the aid of the apparatus of Fig. 26; Fig. 31 is a cross-section showing a series of crystal detectors replacing the distributed resistance member of Fig. 15; Fig. 31a is a cross-section showing a wave energy absorber comprising a plurality of thermoelectric couples; Fig. 32 is a diagram showing the distribution of standing wave energy in apparatus such as that of Fig. 18; Fig. 33 is a corresponding curve diagram showing coordinate adjustments in the apparatus of Fig. 32; Figs. 34 and 35 are vertical and horizontal longitudinal sections showing the interposition of a Lecher wire system in connection with an energy absorber for asymmetric magnetic waves; Fig. 36 shows a Lecher wire system used in connection with symmetric magnetic waves; Fig. 37 shows a Lecher wire system used to establish an impedance match between two wave guides of different sizes for symmetric electric waves; Figs. 38 and 39 show two forms of another type of energy absorber suitable for symmetric electric waves; Figs. 40 and 41 show a modification which is suitable for both symmetric and asymmetric magnetic waves; Figs. 42 and 42a show the principle of Fig. 18 in connection with an energy source instead of an energy sink; Fig. 43 shows a modification obtained by putting a source in place of the receiver of Fig. and 42A show the principle of Fig. 18 in connecsorbers incorporated in the sheaths of respective dielectric guides; and Fig. 48 shows such an absorber within the guide but close to its sheath.

Our invention relates to receiving and transmitting electromagnetic wave energy in the form of displacement current waves in a dielectric guide. By a dielectric guide from one place to another place, we mean a body of dielectric extending from the one place to the other place and bounded laterally by a dielectric discontinuity. For example, the body of dielectric may be empty space or air enclosed within a metallic pipe extending from the one place to the other. The waves in such a dielectric guide may be of several different types as indicated in Figs. 1 to 8 where a pipe or metallic sheath is shown with its wall thickness greatly exaggerated to make the diagrams plainer. In these figures continuous lines represent lines of electric force and dotted lines represent the corresponding lines of magnetic force. The waves whose lines of force have the configuration shown in Figs. 1 and 2 are symmetric electric waves. Similarly, Figs. 3 and 4 show symmetric magnetic waves; Figs. 5 and 6 show asymmetric electric waves; and Figs. 7 and 8 show asymmetric magnetic waves.

In the transmission of such waves it may be desirable to receive them at some place with non-reflection of their energy, that is, with impedance match. For some purposes it will be sufficient that the termination will be simply non-reflecting; that is, it will be merely a sink for the energy flowing thereto along the wave guide. In other cases it may be desirable not only that the termination shall be non-reflecting, but that it shall deliver to an external circuit in usable form some or all of the energy of the received waves.

Referring to Fig. 9, the metallic pipe guide 101 is at the receiving end, for waves incoming from the left. It is closed across its end by the piston 102, which is adjustable longitudinally by means of the rack 103 and the corresponding pinion 104. Between the flanges 105 a thin resistance disk film 106 is clamped so as to extend across the pipe guide. This apparatus is adapted for receiving waves of any of the types of Figs. 1 to 8. Its mode of operation may be explained as follows: Electromagnetic waves progressing along the guide from the left strike the front face of the film 106 and are partially reflected, partially absorbed, and partially transmitted. The transmitted part is totally reflected from the face of the plunger 102 which is made of good conducting material. The reflected wave going to the left from 102 encounters the film 106 and is again partially reflected, partially absorbed, and partially transmitted. Further reflections between the plunger 102 and the film 106 occur with diminishing intensity. The parts reflected and transmitted toward the left at the film 106 may have a phase relation such that they will add vectorially to something less than the sum of their absolute magnitudes, or indeed, they may add substantially to zero. It is possible by adjusting the location of the plunger 102 and the resistivity and thickness of the film 106 substantially completely to absorb the total energy of the incoming waves from the left in the resistance film 106.

The film 106 may be a disk of carbon or it may be made by sputtering metal upon a thin sheet of Bakelite, or this film may be made by painting a water suspension of graphite upon a sheet of paper. Experimental apparatus adapted for getting the proper adjustments is shown in Fig. 26. The dielectric guide was not made continuous from the source to the sink in this case, but the energy from the source was radiated into the funnel-like end of the receiving guide so as to provide a convenient adjustment for intensity and to avoid any troublesome discontinuity at the left. With the apparatus of Fig. 26 films of various resistivities were tried at 106' and various adjustments of the spacing $\delta$ between the film and the piston or plunger were tried. By an adaptation of the apparatus not indicated in the drawings, the detector 112 shown in Fig. 26 was adjustable longitudinally. If there were no resultant reflection to the left from the absorbing film, this detector should give the same reading at all adjustments. If there is such a reflection, then standing waves will be set up, and as the detector is moved along it will give maximum and minimum readings. The ratio of the minimum to the maximum is taken here as a measure of the degree of absorption, that is, the degree of approach to a perfect impedance match. These ratios are plotted as ordinates in Fig. 27 with the intervals $\delta$ as the corresponding abscissas. Each curve of Fig. 27 is for a corresponding film resistivity. In these experiments the resistance of a film was taken arbitrarily to be its resistance measured between a circular central electrode ¼ inch in diameter and a concentric annular ring electrode having its inside diameter 4⅞ inches.

As Fig. 27 shows, a film of 270 ohms gives an absorption coefficient of about 0.9 at a spacing of $\delta=13.3$ centimeters. By interpolation with other values obtained, it appears that a film of about 280 ohms would give complete absorption, that is, an absorption coefficient of unity. The measurements in this case were made at a frequency of about 1900 megacycles per second and with asymmetric magnetic waves, but the theory and method would be essentially the same for other types. In Fig. 28 the maxima of Fig. 27 are plotted against the arbitrary film resistance as abscissas, showing the optimum ratio 1.0 at about 280 ohms.

The device of Figs. 10 and 11 is similar to that of Fig. 9 except that instead of the film 106 of Fig. 9 there is a single diametral resistance wire 107 in front of the reflecting piston 102. This apparatus is adapted for the reception of asymmetric magnetic waves in which the principal component of the electric lines of force is in or parallel to the plane containing the axis and the conductor 107. The systems of Figs. 12 and 13 and of Figs. 14 and 15 vary from that of Figs. 10 and 11 in that the resistance wires are differently distributed so as to lie along the lines of electric force of other types of waves. Figs. 12 and 13 are adapted for symmetric electric waves. The axial conductor has conductive contact with the piston, thus completing a metallic circuit for the radial resistors. Figs. 14 and 15 are adapted for symmetric magnetic waves.

Referring to Figs. 10 and 11, although the resistance wire 107 lies only along a single diameter, it has been shown experimentally that adjustments may be made so that it will absorb substantially all the energy of an incoming wave. Some of the energy of the initial incoming wave is absorbed directly by resistor 107 and some is absorbed from the wave reflected by the plunger 102. If there is any reflection due to the presence of the resistor itself, it may be that the components to the left from the resistor 107 are in different phase so that they add vectorially to zero.

With the same apparatus as in Fig. 26, except that the film is replaced by a resistance wire at 106', experiments were made at different resistances which gave the measurements plotted in Fig. 29. As indicated by the legends, the absorption coefficient explained heretofore was determined at various spacing $\delta$ for various resistances in the form of pencil leads and graphite resistance rods ⅛ inch in diameter. The curves of Fig. 29 and further data not plotted in that figure indicate that with pencil leads a resistance of 2,000 ohms absorbed nearly all the power. When ⅛ inch graphite rods were used, the most favorable resistance was about 700 ohms. It may be that the difference was due to the difference in skin effect, inasmuch as the graphite rod was considerably thicker than the pencil lead. The frequency employed was, as in the experiment with the films, 1900 megacycles per second. From the data in Fig. 29, the curves of Fig. 30 were plotted, in the same way that from Fig. 27, the curves of Fig. 28 were plotted.

In each of Figs. 10 to 15 distributed resistances were used, that is, high resistance wires of substantially uniform resistance were placed as absorbers within the dielectric guide in directions lying along the lines of electric force in the waves. The system of Figs. 16 and 17 differs from that of Figs. 10 and 11 in that the resistance is lumped in the diametral conductor of Figs. 16 and 17. The mode of operation and the theory of the system of Figs. 16 and 17 is much the same as for Figs. 10 and 11. However, in Figs. 16 and 17 another degree of freedom for adjustment is afforded by moving the lumped resistance along the diametral conductor; a resistance value which is not optimum at one place may become so at another place of adjustment along the diametral conductor. Thus, it becomes possible to secure an optimum condition of impedance match without adjusting the magnitude of the resistance, but merely by varying its location along the diametral conductor of which it is a part. For a specific example, in a guide having a diameter of 5 inches with an asymmetric magnetic wave and at a frequency of 1900 megacycles per second, it was found that a lumped resistance below 2,000 ohms could not be made a perfect absorber of energy at any adjustment, but when the lumped resistance had a value between 2,000 ohms and 10,000 ohms, it could be readily matched in for perfect absorption by adjustment along the diameter of its conductor. In this experiment the tests were not carried to values higher than 10,000 ohms.

With the explanation that has been given for Figs. 16 and 17 in connection with asymmetric magnetic waves, it will readily be understood how the serially distributed resistance wires of Figs. 12 to 15 might be replaced by highly conductive wires, each with an interposed lumped resistance therein, much as the change has been made from Figs. 10 and 11 to Figs. 16 and 17. If lumped resistances are substituted for the ring-like resistor of Figs. 14 and 15, they will be distributed symmetrically and connected so that the ring will be adjustable in size.

The resistance elements heretofore mentioned are mere sinks or dissipators for received energy. A distributed linear resistance, such as 107 in Figs. 10 and 11 may be made to have a non-linear characteristic and be shunted by a signal indicating circuit. The lumped resistance, as of Fig. 16, may be an asymmetric resistance, such as a crystal detector and shunted by a signal indicating circuit. Sensitive detecting elements may be scattered and connected so as cumulatively to build up a practicable detecting effect. For example, the ring conductor of Figs. 14 and 15 may be modified as shown in Fig. 31, by breaking it open, but reconnecting its ends for high frequencies through a condenser, interposing like-directed crystal detectors along its length, and taking off a signal indicating circuit across the condenser terminals. In any such case, the signal current leads will be carried along equipotential lines, so that they will be cut at right-angles by the lines of electric force of the waves.

Another energy delivering absorber is shown in Fig. 31a, which may take the place of the resistance film 107 of Figs. 10 and 11. A plurality of thermoelectric couples are placed across the path of the waves in the dielectric guide and connected in a signal indicating circuit. The axis of each couple is along the lines of electric force; for example, the arrangement of Fig. 31a is suitable for asymmetric magnetic waves.

Each of the terminal structures so far discussed comprises a resistive element and a reflector, and it has been shown that for any particular resistive element there is an optimum position for the reflector, that for any particular spacing of reflector and resistive element there is an optimum resistance for the latter element or an optimum transverse position, and that for perfect termination some or all of these several variables are uniquely determined. The terminal structures now to be described permit another degree of freedom. They may be generically described as being capable of introducing an impedance transformation whereby a resistance of one magnitude may be made to appear as a resistance of another magnitude. Specifically, any particular resistive element may be utilized in a terminal structure with the same effect as an element of optimum resistance, for example, an element having an otherwise uniquely determined optimum resistance.

The incoming dielectric guide 108 of Fig. 18 opens at its end through an adjustable iris 109 into the side of a comparatively short length of dielectric guide 110 closed at both ends by adjustable perfectly reflecting pistons 102 and 102'. The element represented by 106' may be an absorbing film as in Fig. 9 or an absorbing linear conductor as at 107 in Fig. 10. This resistance element 106' is capable of adjustment longitudinally in relation to the chamber or limited guide section 110. As compared with Fig. 9, the system of Fig. 18 has the advantage that within convenient limits the magnitude of the resistance 106' needs no adjustment. Suppose for the moment that this resistor 106' is removed, leaving merely the empty chamber between the two pistons 102 and 102'. When the distance between these pistons is an integral number of half wave-lengths there is set up a standing wave system of substantial amplitude in the cross-chamber 110 as indicated by the curve of Fig. 32. The amplitude of this standing wave can be adjusted by changing the place at which the incoming wave guide 108 is coupled to the cross-chamber 110. If the connection is made at a quarter point such as indicated at A on the curve, the amplitude in the main guide and in the cross-chamber would be the same, but if the coupling is made at some other point, such as B, the amplitude in the cross-chamber will be greater than in the main guide. That is, the standing wave will build up to such a magnitude that its intensity at the point where the main guide connects will be the same as in the main guide. Accordingly, if a high resistance absorber 106' is to be used, the intensity of the electric field applied to it can be increased and an impedance stepping-down action can be secured by locating the axis of the guide at a point such as B and placing the absorber at a point such as C, near a peak of the curve. For an absorber of low resistance, a step-up action can be obtained by locating the axis of the guide, say at A and the absorber at D. A given transformation ratio can be obtained with any one of a number of combinations of the absorber and piston locations; if the point of coupling of the guide to the chamber is changed so as to change the wave amplitude in the chamber, the absorber can be moved to another location where the amplitude of the field impressed upon it will be the same. The foregoing statement is in accordance with reasonable theory and is checked by experiment.

Referring to Fig. 33, this shows various coordinate adjustments, each coordinate adjustment being suitable for complete absorption of the received energy, that is, for a complete impedance matching or non-reflecting termination. If one lays a horizontal straight line across Fig. 33 at a height corresponding to any arbitrary spacing Δ between the axis of the main guide and the resistor, then the intercepts on the straight line given by the three curves of the figure will give the corresponding coordinated adjustments $\delta_1$ and $\delta_2$ for the two pistons to secure a complete impedance match.

It will be appreciated that the adjustment of the two pistons and of the spacing between the main guide and the absorber is comparatively easy. This system obviates the need for any adjustment of the resistance value of the energy absorber, which may be a somewhat troublesome adjustment to make.

Experiments show that there are certain sets of locations of the absorber and of the two pistons, generally near the middle of the range of movement indicated on Fig. 33, for which small variations in the positions of the three elements produce but small departures from the condition of impedance match. On the other hand, there are other sets of locations, for which similar small variations cause the impedance of the assemblage to vary greatly from the characteristic value, the impedance of the assemblage being then "critical" to changes in its dimensions. Theory, verified by rough observations made during the course of these experiments, indicates that the impedance offered by a termination with the first-mentioned set of adjustments varies but slowly with frequency, while the impedance of a termination which is adjusted to a "critical" set of dimensions holds the characteristic value only over a very narrow band of frequencies. For a broad band receiver, a set of adjustments belonging to the first-mentioned class is desirable, but when, for example, it is desired to separate a narrow band of frequencies from closely neighboring frequencies, a termination corresponding to the second class of adjustments will be useful.

Figs. 19 and 20 show structural modifications as compared with Fig. 18, which will be readily understood. The principle of operation involved is generally and essentially the same. In all these figures the resistor is longitudinally adjustable in position.

In Fig. 21 the adjustable iris 109' acts as the end boundary of the chamber lying between it and the piston 102. Figs. 22 and 23 show specific modifications as compared with Fig. 21. All three of these figures depend on a sort of resonance for their operation. A simple way to describe this operation is to consider a wave which is incident from the left upon the iris 109'. Part of its energy is reflected and part passed through the aperture into the chamber, the relative proportion being adjustable by adjusting the size of the aperture. In the chamber, the energy is partly absorbed by the absorber 106' and the remainder is reflected back, part of it going out through the aperture at the iris 109'. By adjustment of this aperture and its distance from the absorber and the distance from the absorber to the piston 102 the total energy reflected to the left can be made zero.

In many or all of the combinations which have been described heretofore, modification may be made so that the absorber of energy will be embodied in an additional dielectric guide by which the wave energy is conducted away from the standing wave apparatus. Instead of the resistor 106' in Fig. 21, an outgoing wave guide may be connected to the standing wave chamber, as at 106" in Fig. 25. The input and output wave guides may be of different characteristic impedances, as will be the case if they are of different diameters. Fig. 24 shows a somewhat different arrangement of the input and output wave guides in relation to the intermediate, impedance matching, standing wave chamber.

Another form which may be taken by the energy absorber is indicated in Fig. 25a. The horn shown may be a practically perfect radiator of electromagnetic waves of the type and frequency for which it is designed; that is, it can be so proportioned as to reflect practically none of the energy applied to it from the guide. If it be found that a particular horn so proportioned does not have the most desirable directional properties, the horn may be redesigned to have the desired directional properties and a lateral chamber provided near the throat of the horn, adjustable in depth by means of a piston, as shown, whereby a reflectionless termination may be obtained. Even in the extreme case where the horn is of the same diameter as the guide, that is, where the guide is abruptly terminated, the piston may be so adjusted in position that all of the energy in the guide is radiated without reflection.

Referring to Figs. 34 and 35, these are respectively vertical and horizontal sections both along the axis of a pipe guide combined with a Lecher wire system adapted for receiving asymmetric magnetic waves. The diametral wire 107'-107" corresponds to the diametral wire of Figs. 16 and 17 except that instead of interposing a simple lumped resistance as in Figs. 16 and 17, this lumped resistance is replaced by the Lecher wire system in Figs. 34 and 35. In other words, the diametral wire 107 of Figs. 10 and 11 is replaced by the two parts 107' and 107" which are respectively connected at intermediate points of the transverse Lecher wire pair 121 which extends outside the guide through the two opposite holes 122 provided for that purpose. It will be readily appreciated that the incoming waves result in the application of periodic alternating electromotive forces across the Lecher wire system at the two points of connection of the diametral wire 107'-107". Accordingly, a system of standing waves may be set up on the Lecher wires 121. They are bridged by two relatively high capacity condensers 123 which are adjustable along the Lecher wires, also by a crystal detector 124 which is adjustable likewise. By well-known procedure the adjustments may be made to build up the standing waves on the Lecher wires to their greatest possible amplitude, and to place the detector 124 at a current node or other optimum point. The usual low frequency signal indicator may be connected around the detector 124.

In view of the foregoing explanation of the combined dielectric guide and receiving Lecher wire system for asymmetric magnetic waves, it will be readily apparent how the combined system of Fig. 36 is adapted for the reception of symmetric magnetic waves. The condenser 125 is introduced in the loop receiving wire 126 so as not to short circuit the low frequency currents of the detector circuit.

For receiving symmetric electric waves, the Lecher wires may be connected each to a half antenna 127 lying in the axis of the dielectric guide as shown in the upper part of Fig. 37.

In general, a Lecher wire system may be used as a transformer to match two dielectric guide impedances. This is illustrated in Fig. 37. The antenna pair 127 receives the wave energy in the dielectric guide coming from the left and puts this energy on the Lecher wire pair, whence it is taken off by the antenna pair 127' and transmitted in electromagnetic wave form to the right in the corresponding outgoing dielectric guide. The two guides are adjustable toward and from each other along the length of the Lecher wires. By this adjustment and other suitable adjustments the impedances of the two guides may be matched through the intermediate Lecher wire system.

In examples of our invention disclosed heretofore, the energy absorbing resistances or other energy absorbing elements have been introduced within the dielectric guide. But they may be introduced by modifications involving or associated with the walls or casing of the guide. In Fig. 38 an adjustable circumferential slot 131 is made in the guide wall and surrounded by an annular chamber between conductive annular plate walls and comprising between them a circumferential energy absorbing member 132, beyond which is a surrounding metallic boundary 132'. By making the proper adjustments of the piston 102, and of the width of the opening 131, and of the radial distance of the energy absorbing member 132, the energy of incoming symmetric electric waves may be absorbed with substantial completeness.

The form of the invention shown in Fig. 39 will be somewhat easier to realize in practice than that of Fig. 38. Here the surrounding annular chamber lies between cylindrical walls and the power absorbing material 142 and end wall of the chamber 142' are longitudinally displaceable annuli. The annular chamber which extends lengthwise between the circumferential slot and the member 142' may be regarded as a coaxial transmission line whose outer conductor is the outer cylinder and whose inner conductor is the wall of the wave guide.

In the apparatus shown in Figs. 40 and 41 there are two opposite adjustable longitudinal slots 135 connecting with flat transverse chambers having the shape shown in the drawings. These chambers, adjustable as to length by means of the rectangular plates 137, contain rectangular plates of power absorbing material 136 which also are movable through the chamber. The system is adapted for absorbing to a substantial degree the energy of either symmetric or asymmetric magnetic waves. Though the two slots are sufficient for absorbing the power of asymmetric magnetic waves, it may be advantageous to have more than two such slots evenly distributed around the guide for symmetric magnetic waves.

As has been remarked heretofore, receiving end apparatus often suggests a proper corresponding design for sending end apparatus and vice versa. Figs. 42 and 42A are somewhat like Fig. 18 except that the energy sink 106' of Fig. 18 is replaced by the energy source 141 of Fig. 42. With the source 141 in operation at a certain frequency, adjustments may be made so that a standing wave system will be set up in the transverse guide with effective energy transfer therefrom to the main guide. Thus the maximum possible output from the generator 141 may be obtained.

Fig. 43 corresponds to Fig. 35 with the principal difference that the detector 124 of the earlier figure is here replaced by the source or generator 141'. With the explanations that have been given heretofore, the principle of Fig. 43 will be apparent without the need for further explanation at this place.

In all of the types of waves in a metal-sheathed wave guide, there will be lines of electric force which in substantial degree will extend to or close to the metal sheath. Accordingly, an energy absorbing element may be incorporated in the sheath or placed close to it. For all types of waves the device of Fig. 44 will function much like the device of Fig. 9, the interposed ring R of resistance material in Fig. 44 corresponding functionally to the resistance film 106 of Fig. 9. For a particular type of waves in the wave guide, the peripheral resistor or energy absorber may take a corresponding special form. For example, if the waves are of asymmetric electric type, with their lines of electric force as indicated in Figs. 45 and 46, their energy will be absorbed by the resistor material R' filling the transverse slots as shown.

By constricting the metal sheath or guide wall and placing the resistor or absorber at the constriction, the absorption of energy may be intensified. This principle is illustrated in Fig. 47 which may be compared with Fig. 44.

Another modification is to put the resistor within the guide wall but close to it, as shown in Fig. 48, instead of interrupting the guide wall and interposing the resistor therein as in Fig. 44. The resistor may be in contact with the metal sheath or spaced slightly from it.

All the modified resistors of Figs. 44 to 48 may be used in the different kinds of impedance terminations such as the single piston kind shown in these figures or the double piston kind of Figs. 18 to 20.

We claim:

1. An energy dissipating termination for a wave guide comprising a metallic pipe which comprises a cross pipe into which the end of said guide opens, opposite reflectors in said cross pipe, and an ohmic resistor within said cross pipe between said reflectors, said resistor lying along the electric lines of received waves in said cross pipe and at such point between said reflectors that the energy of said received waves is completely absorbed and dissipated in the form of heat.

2. In combination, a wave guide consisting essentially of a metallic pipe, a reflector terminating it, and an ohmic resistance element within said guide near the reflector and extending in the direction of the lines of electric force of received waves in said guide, said element being of such resistance and so spaced from said reflector that wave energy incident upon it is substantially completely transformed into heat.

3. In combination, a wave guide comprising a metallic pipe, a terminating chamber therefor, an iris connecting said guide and chamber, a reflector forming a partial boundary of said chamber and an ohmic resistance member lying across said chamber, the resistance of said member and the location of said member between said iris and said reflector being so correlated that wave energy entering said chamber is substantially completely dissipated.

4. The method of absorbing and dissipating the energy of a system of electromagnetic waves received in a dielectric guide which consists in reflecting the received waves to set up a standing wave system and absorbing their energy in a resistance element suitably placed along the length of said standing wave system, the placing and the resistance of said element being so correlated that the energy of said waves is substantially completely dissipated.

5. In combination, a dielectric guide consisting essentially of a metallic pipe, a reflector at its receiving end, and a resistance film lying in a transverse plane across the guide in front of said reflector.

6. In combination, a dielectric guide consisting essentially of a metallic pipe, wave reflecting means at one end thereof, and a wave energy absorber comprising a resistance film disposed transversely across the guide in front of said reflector, the correlation of the resistance of said film and the distance between said film and said reflecting means being such that the impedance of said absorber is matched with the impedance of the guide.

7. A combination in accordance with claim 6 in which the said correlation is uniquely determined.

8. In combination, a wave guide comprising a metallic pipe, means for establishing within said pipe progressive electromagnetic waves of such nature that the guide presents to them the characteristic of a high-press filter, and a termination for said guide comprising means for reflecting the waves within said pipe and means in front of the reflecting means and localized along said pipe for receiving both the direct and the reflected waves, the resistance of the receiving means and the distance between said receiving and reflecting means fixing the impedance presented by said termination, said resistance and said distance being uniquely correlated so that the impedance of said termination is equal to the characteristic impedance of said guide, whereby said waves are received without substantial reflection of energy away from said termination.

9. In combination, a wave guide adapted for the transmission of asymmetric electromagnetic waves, an ohmic resistance element at the receiving end providing a diametral resistance path in the plane of polarization of electric force of said waves, and a reflector across the guide wall beyond said element in the direction of wave propagation, the resistance of said element and the distance separating it from said reflector being uniquely correlated to effect substantially complete absorption of incident wave energy.

10. In combination, a wave guide consisting essentially of a metallic pipe, and a termination for said guide comprising a cross pipe chamber into which the guide opens, an iris across the opening, two pistons in the cross pipe on either side of said opening, and a transverse ohmic resistor within the cross pipe, the size of the iris aperture and the respective positions of said pistons and resistor relative to said iris being so correlated that said guide and said termination are substantially matched in impedance.

ARCHIE P. KING.
ARNOLD E. BOWEN.